(12) United States Patent
Whitehurst et al.

(10) Patent No.: US 9,396,369 B1
(45) Date of Patent: Jul. 19, 2016

(54) ELECTRONIC TAG TRANSMISSIONS CORRESPONDING TO PHYSICAL DISTURBANCE OF TAG

(71) Applicant: Apple Inc., Cupertino, CA (US)

(72) Inventors: Todd Whitehurst, Cupertino, CA (US); Zachury Minjack, San Francisco, CA (US); Zachery Kennedy, San Jose, CA (US); Dennis Park, Cupertino, CA (US); Dylan Edwards, Cupertino, CA (US); Anton Davydov, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 14/613,165

(22) Filed: Feb. 3, 2015

Related U.S. Application Data (60) Provisional application No. 62/111,214, filed on Feb. 3, 2015, provisional application No. 62/111,292, filed on Feb. 3, 2015.

(51) Int. Cl.
  *G08B 23/00* (2006.01)
  *G06K 7/10* (2006.01)
  *G08B 13/24* (2006.01)

(52) U.S. Cl.
  CPC ........ *G06K 7/10297* (2013.01); *G08B 13/2417* (2013.01)

(58) Field of Classification Search
  CPC .................. G06K 7/10297; G08B 13/2417
  USPC ....................................... 340/572.1
  See application file for complete search history.

(56) References Cited

U.S. PATENT DOCUMENTS

| 8,381,998 B1 * | 2/2013 | Chang .............. G06K 19/07786 235/492 |
| 8,628,722 B2 | 1/2014 | Hyde et al. |
| 2005/0258963 A1 * | 11/2005 | Rodriguez ......... G03G 21/1878 340/572.1 |

FOREIGN PATENT DOCUMENTS

EP   2648123 A1   10/2013

OTHER PUBLICATIONS

U.S. Appl. No. 14/686,341, filed Apr. 14, 2015, entitled, "Electronic Tag Transmissions Corresponding to Alcohol Content Identifications," (unpublished).

(Continued)

*Primary Examiner* — Juan A Torres
(74) *Attorney, Agent, or Firm* — Kilpatrick Townsend & Stockton LLP (57) ABSTRACT

In some embodiments, a seal is provided that includes an adhesive bottom layer, a non-adhesive top layer, and an electronic tag. The electronic tag can be positioned on or in the adhesive bottom layer or non-adhesive top layer or positioned in between the adhesive bottom layer and non-adhesive top layer. The electronic tag can include one or more processors and a computer-readable storage medium containing instructions, that, when executed by the one or more processors, cause the one or more processors to perform actions. The actions can include detecting, at the electronic tag, a physical disturbance of the electronic tag and retrieving, at the electronic tag, stored data from a local memory. The actions can also include, responsive to the detection, facilitating transmission of a signal from the electronic tag that includes the retrieved data from a transmitter of the electronic tag to a device using radio frequency identification (RFID).

30 Claims, 7 Drawing Sheets

(56) References Cited

OTHER PUBLICATIONS

U.S. Appl. No. 14/686,179, filed Apr. 14, 2015, entitled, "Electronic Tag Transmissions of Custom-Order Nutritional Information," (unpublished).
Boyle, T., "Fast Food Does QR Codes: Part 2 Taco bell," Qfuse, Aug. 14, 2013, http://gfuse.com/blog/fast-food-does-qr-codes-part-2-taco-bell/, downloaded Aug. 10, 2015, 3 pages.
Great Bytes Software, "FitTap," Google Play, 2014, https://play.google.com/store/apps/details?id=com.greatbytes.fittap&hl=en, downloaded Aug. 10, 2015, 2 pages.
Talbot, T., "QR codes: The key to loyalty and payments?," Mobile Marketer, Mar. 2013, http://www.mobilemarketer.com/cms/opinion/columns/15010.html, downloaded Aug. 10, 2015, 4 pages.
Perez, S., "Tagstand is NFC-Enabling a Giant Cocktail Party, Will Let Guests Facebook & Tweet From Their Wristbands," TechCrunch, May 11, 2012, http://techcrunch.com/2012/05/11/tagstand-is-nfc-enabling-a-giant-cocktail-party-will-let-guests-facebook-tweet-from-their-wristbands/, downloaded Aug. 10, 2015, 7 pages.
Questex, LLC., "Home Depot, Macy's, Target Evaluating QR Codes That Show Different Things Based on the Consumers CRM," FierceMarkets, Oct. 2011, http://www.fierceretail.com/retailit/story/home-depot-macys-target-evaluating-qr-codes-that-show-different-things-based-on-the-consumers-crm, downloaded Aug. 10, 2015, 3 pages.
RapidNFC, "NFC Enabled Beer Mats," Mar. 24, 2013, http://web.archive.org/web/20130324042717/http://rapidnfc.com/item/135/other_nfc_products_nfc_enabled_beer_mats, downloaded Aug. 11, 2015, 2 pages.
Swedberg, C., "BarMaxx RFID Solution Tracks Liquor Usage by Weight," RFID Journal, Jan. 2013, http://www.rfidjournal.com/articles/view?10264, downloaded Aug. 10, 2015, 3 pages.
Swedberg, C., "Beverage Metrics Serves Up Drink-Management Solution," RFID Journal, Feb. 2011, http://www.rfidjournal.com/articles/view?8237, downloaded Aug. 11, 2015, 3 pages.
Swedberg, C., "NFC System to Aid Diners," RFID Journal, May 2011, http://www.rfidjournal.com/articles/view?8446, downloaded Aug. 10, 2015, 2 pages.
Swedberg, C., "Vegas Hotel-Casino Uses Tags to Keep Tabs on Liquor," RFID Journal, Jun. 2006, http://www.rfidjournal.com/articles/view?2447, downloaded Aug. 10, 2015, 1 page.
WMS Group, Inc., "Tag! You're It! Creative Ways to Use the New QR Code Technology," Feb. 18, 2014, http://web.archive.org/web/20140218011108/http:/wmsgroup.com/tag-youre-it-creative-ways-to-use-the-new-qr-code-technology, downloaded Aug. 11, 2015, 2 pages.
Wood, D., "Digital Receipt Tipping Point Within Two Years," Peace Journalism, Jun. 21, 2013, http://peacejournalism.com/blog/2013/06/21/digital-receipt-tipping-point-within-two-years/, downloaded Aug. 10, 2015, 4 pages.

\* cited by examiner

ELECTRONIC TAG TRANSMISSIONS CORRESPONDING TO PHYSICAL DISTURBANCE OF TAG

CROSS-REFERENCE TO RELATED APPLICATIONS

The present disclosure claims the benefit of and priority to U.S. Provisional Application No. 62/111,214, filed on Feb. 3, 2015, and U.S. Provisional Application No. 62/111,292, filed on Feb. 3, 2015. Each of these applications is hereby incorporated by reference in its entirety for all purposes.

FIELD OF INVENTION

The present disclosure relates generally to one or more electronic tag transmissions indicative of whether the tag has been physically disturbed (e.g., ripped, torn or at least partly separated). For example, the tag can condition a transmission on detecting a physical disturbance of the tag, or a characteristic of one or more signals (e.g., whether a signal from the tag abruptly stopped being received or abruptly changed in signal strength) can indicate whether a physical disturbance has occurred.

BACKGROUND

Electronic tags can transmit a variety of types of data to nearby electronic devices. An electronic device can then store the data and/or use the data to influence operation of an app running on the device. However, some types of data may not be applicable or of interest to users of particular devices. Consequentially, storage space may be unnecessarily consumed and/or app function can be undesirably influenced.

SUMMARY

In some embodiments, a seal is provided that includes an adhesive bottom layer, a non-adhesive top layer, and an electronic tag. The electronic tag can be positioned on or in the adhesive bottom layer or non-adhesive top layer or positioned in between the adhesive bottom layer and non-adhesive top layer. The electronic tag can include one or more processors and a computer-readable storage medium containing instructions, that, when executed by the one or more processors, cause the one or more processors to perform actions. The actions can include detecting, at the electronic tag, a physical disturbance of the electronic tag and retrieving, at the electronic tag, stored data from a local memory. The actions can also include, responsive to the detection, facilitating transmission of a signal from the electronic tag that includes the retrieved data from a transmitter of the electronic tag to a device using radio frequency identification (RFID). The seal can be configured to be positioned on a food container containing a food item so as to inhibit opening of the food container. The retrieved data can include nutritional information for the food item.

In some embodiments, an electronic tag is provided. The electronic tag can include one or more processors and a computer-readable storage medium containing instructions, that, when executed by the one or more processors, cause the one or more processors to perform actions. The actions can include detecting, at the electronic tag, a physical disturbance of the electronic tag and retrieving, at the electronic tag, stored data from a local memory. The actions can also include, responsive to the detection, facilitating transmission of a signal from the electronic tag that includes the retrieved data from a transmitter of the electronic tag to a device using RFID.

In some embodiments, a computer-implemented method is provided. At an electronic tag, a physical disturbance of the electronic tag can be detected. At the electronic tag, stored data can be retrieved from a local memory. Responsive to the detection, a signal that includes the retrieved data can be transmitted from a transmitter of the electronic tag to a device using RFID.

In some embodiments, an electronic device is provided. The electronic device can include one or more processors and a computer-readable storage medium containing instructions, that, when executed by the one or more processors, cause the one or more processors to perform actions. The actions can include detecting, at the electronic device, data in one or more signals received from an electronic tag and detecting, at the electronic device, a physical disturbance of the electronic tag based on the one or more signals. The actions can also include, responsive to the detection, storing or using the data at the electronic device.

In some embodiments, a computer-implemented method is provided. At an electronic device, one or more signals can be received from an electronic tag. The one or more signals can include data. At the electronic device, a physical disturbance of the electronic tag can be detected based on the one or more signals. Responsive to the detection, the data can be stored or used at the electronic device.

The following detailed description together with the accompanying drawings will provide a better understanding of the nature and advantages of the present invention.

DETAILED DESCRIPTION

In certain embodiments of the present invention, an electronic tag and/or electronic device can be configured such that the electronic device selectively receives, stores or uses data from the electronic tag in conditions corresponding to a physical disturbance of the electronic tag (e.g., a ripping, tearing or partial separation of the tag). For example, the electronic tag (e.g., powered via electric and/or magnetic fields from a nearby electronic device) can be configured to detect a physical disturbance, by, e.g., determining whether a particular portion of an antenna is connected to a chip in the tag, determining whether a chip in the tag is connected to a particular pin (or particular number of pins) in the tag, determining whether an above-threshold vibration has been sensed, or determining whether a first antenna in the tag senses a signal from a second antenna in the tag. Upon detecting the physical disturbance, the electronic tag can transmit a signal to a nearby electronic device that includes particular data to the electronic device. As another example, an electronic tag can repeatedly transmit data to a nearby electronic device. However, a physical disruption of the tag can inhibit or stop the transmission or can change a characteristic of the transmission. The nearby electronic device can condition storage and/or use of the data on detection of a change in a tag signal (e.g., an abrupt stop in a tag signal or an change in a power of a tag signal exceeding a negative threshold).

In some instances, the electronic tag can be configured to be or include a sticker. The electronic tag can then be positioned on a container of a product, such as a box containing a fast-food item, a lid on a cup containing a drink, a package containing a toy, and so on. In some instances, the electronic tag can be configured to be party of a container (e.g., part of a take-out bag, food box, toy package, etc.). For example, a container can include a perforation line with the electronic tag straddling at least a portion the line so as to promote a physical disruption of the tag upon opening the container.

Figure 1A:
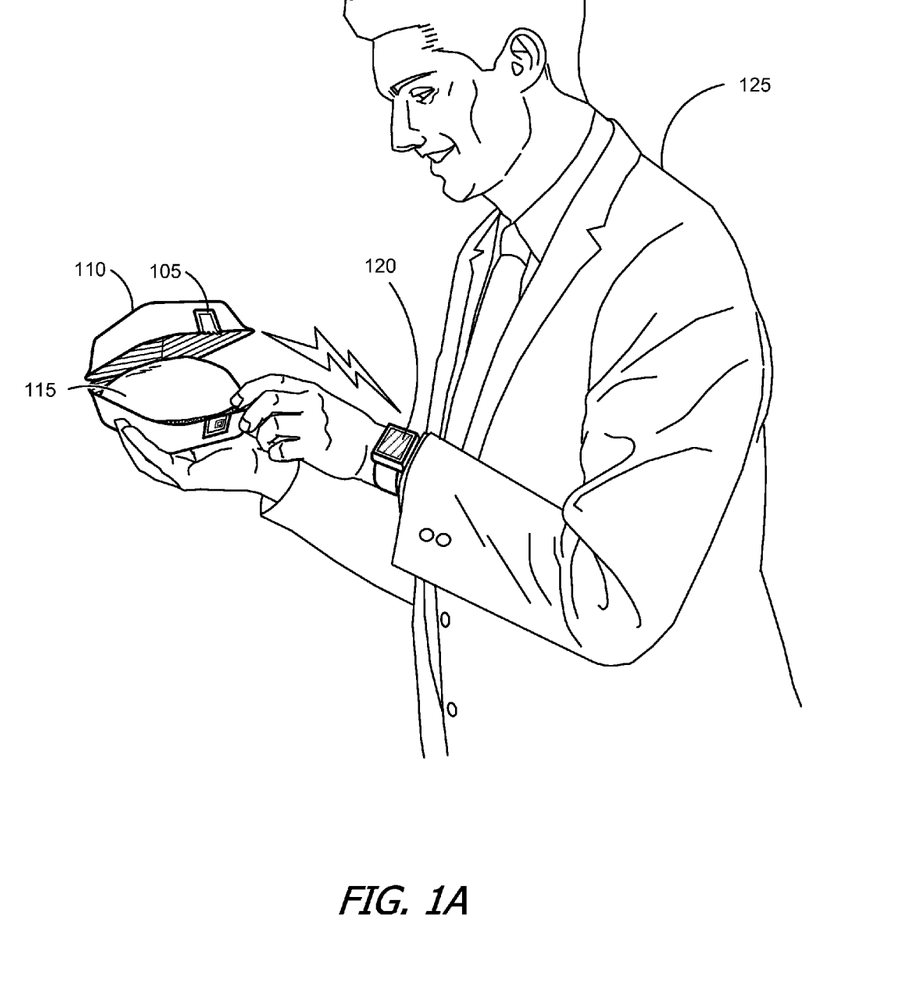
FIG. 1A illustrates an example an electronic tag transmitting data about a food item to an electronic device according to an embodiment of the invention.

The data can include information pertaining to a contained object. For example, FIG. 1A illustrates an example an electronic tag transmitting data about a food item to an electronic device according to an embodiment of the invention. In the illustrated example, an electronic tag is provided as part of a seal 105 that is positioned on a food container 110. In the depicted instance, food container 110 is a box that contains a sandwich food item 115, and seal 105 is positioned along an opening of food container 110 to inhibit opening of the container. Disturbance of seal 105 (e.g., by ripping it) is nonetheless possible, which may also disturb the electronic tag. Disturbance of the electronic tag facilitates or triggers transmission of data from the tag to an electronic device 120, which can include a wearable device worn by a user 125. The data can include nutritional information (e.g., a quantity of calories, fat, salt, sugar or protein) pertaining to food item 115. In some instances, the nutritional information encoded in and transmitted by the tag particularly pertains to food item 115, such that it reflects any customizations of an order and/or such that it does not include nutritional information pertaining to other food items (e.g., non-ordered menu items).

Figure 1B:
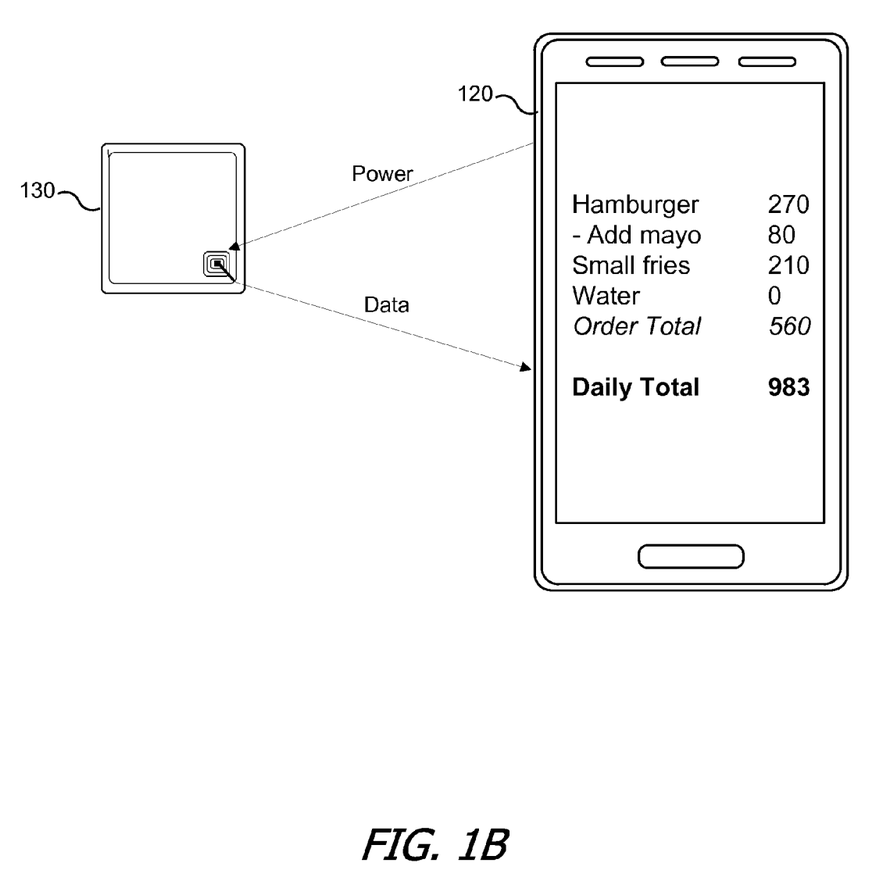
FIG. 1B illustrates one example of a data transmission from an electronic tag 130 (e.g. included in seal 105) to an electronic device 120 according to an embodiment of the invention.

FIG. 1B illustrates one example of a data transmission from an electronic tag 130 (e.g. included in seal 105) to an electronic device 120 according to an embodiment of the invention. In some instances, electronic device 120 can scan for electronic tags by repeatedly (e.g., at least 1, 5 or 20 times per second) transmitting electrical and/or magnetic fields via an antenna (e.g., a radio frequency identification (RFID) antenna). When electronic tag 130 is sufficiently proximate to electronic device 120 to receive the fields, electronic tag 130 can use the energy to power up tag 130, such that it can retrieve and transmit the encoded data to electronic device 120 via an antenna (e.g., an RFID antenna), such as a physical disturbance of tag 130.

Upon receiving the data, electronic device 120 can generate and present a presentation that identifies nutrition variables in the data. For example, in the depicted instance, electronic device 120 can present a calorie count for each item and for the order. Electronic device 120 can further use the data to update one or more cumulative nutrition variables, which can also be presented.

It will be appreciated that the example of FIGS. 1A-1B is illustrative, and that various modifications are contemplated. In some instances, an electronic tag can accompany a different type of package or container and/or can transmit different types of data. For example, an electronic tag can be included as part of a bag or a seal including the tag can be positioned on a bag, and the data can include nutritional information for particular food items to be included in the bag. As another example, an electronic tag can be adhered onto on a toy or toy packaging, and the data can include information about the toy (e.g., instructions or an app customization). As yet another example, an electronic tag can be attached to or included in a lid of a drink, and the data can include an indication that a particular number of reward units are to be added to a user account. Disruption of the electronic tag to retrieve a contained item.

Figure 2A:
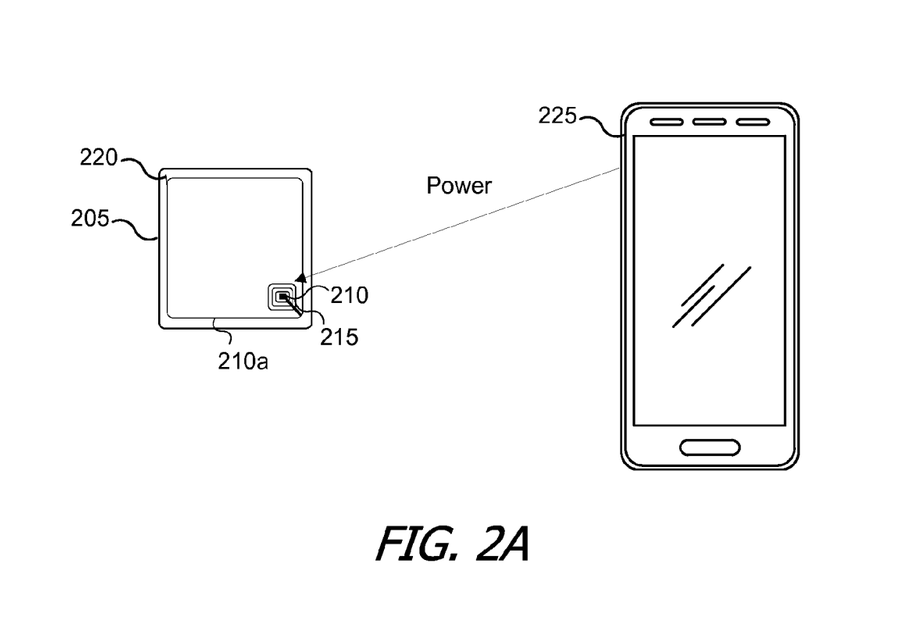
FIGS. 2A and 2B illustrate an example of a conditioned transmission from an electronic tag to an electronic device.
Figure 2B:
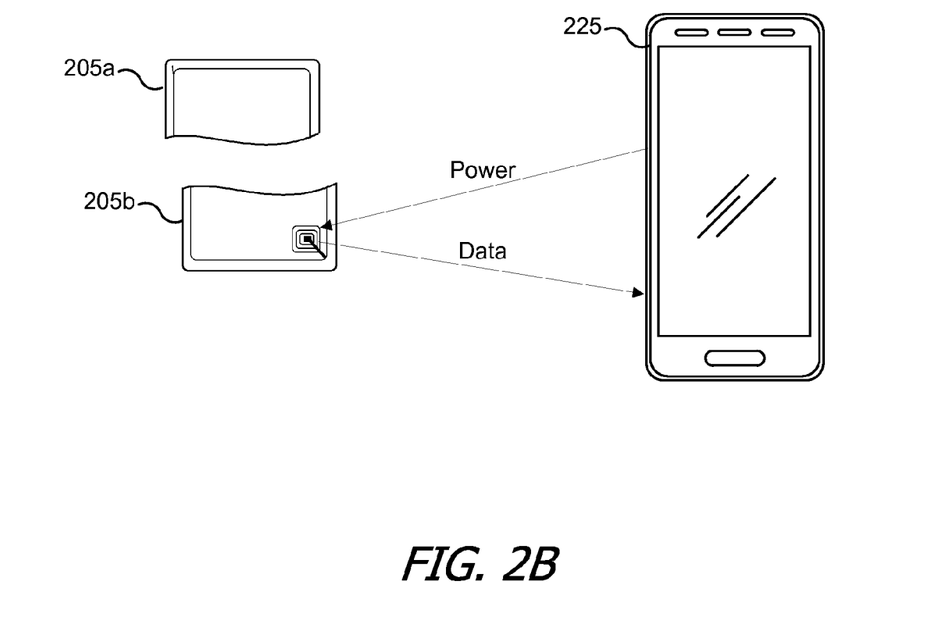

FIGS. 2A and 2B illustrates an example of an electronic tag 205 powered by an electronic device 225 and conditionally communicating data to the electronic device.

Electronic device 225 can routinely scan for nearby electronic tags. For example, electronic device 225 can convert electronic power (e.g., supplied via a battery) to electric and/or magnetic fields and repeatedly (e.g., at least 1, 5 or 20 times per second) transmit signals via an antenna (e.g., an RFID antenna) of the electronic device. A tag antenna 210 of electronic tag 205 can receive the signals, convert the electric and/or magnetic fields back to electronic power, and use the power to power an electronic chip 215 of tag antenna 210.

Electronic chip 215 can use the power to, for example, retrieve data from a local memory, determine whether a transmission condition is satisfied and/or facilitate transmission (e.g., via tag antenna 210) of the retrieved data. Electronic chip 215 can include a microprocessor, memory and/or one or more capacitors (e.g., to tune antenna 210).

Data encoded and/or stored at electronic tag 205 can include, for example, data previously encoded by another (e.g., vendor) electronic user device. The encoded data can, in some instances, correspond to a purchase, product, food item and/or drink item. In one instance, encoded data includes a nutrition variable for a food item (e.g., to be provided with tag 205) and/or an alcohol variable for a drink item (e.g., to be provided with tag 205). In one instance, the data includes a nutrition or alcohol variable for a custom order (e.g., selectively including or reflecting nutrition information for items ordered by and/or being provided to a customer). Additional exemplary detail is provided in U.S. application No. 62/111, 214 and 62/111,292, each filed on Feb. 3, 2015, each of which is hereby incorporated by reference in its entirety for all purposes. The data can include, for example, locked or unlocked data. The data can include variables that can be used by an app on electronic device 225 to track a user behavior (e.g., calorie intake) and/or estimate a user-related variable (e.g., blood alcohol concentration).

Antenna 210 can include, for example, a coil and/or loop antenna. Antenna 210 can include a plurality of loops, in some instances, at least two loops can differ in a radius or other dimension. This variation can allow the loops to be positioned in a plane, which can allow a thickness of electronic tag 205 to remain small. Nonetheless, in some instances, antenna 210 can instead include a plurality of loops having a similar or same radius (and/or some or all other dimensions) and/or being positioned in a stacked manner or a direction orthogonal to a primary surface of tag 205.

In some instances, antenna 210 can be configured so as to be affected by a physical disruption (e.g., of a particular type) of tag 205. For example, antenna 210 can include a segment configured to be severed by a separation of tag 205 into multiple pieces (e.g., tag pieces 205a and 205b). As illustrated in the depicted instance, antenna 210 can include an outer loop 210a having a shape and/or dimension corresponding to that of tag 205. The dimension can be substantially larger (e.g., at least 5, 10, 50 or 100 times larger) than a corresponding dimension of one or all other loops in antenna 210. Outer loop 210a can be positioned so as to be (e.g., in its entirety or at least in one location) within a defined distance (e.g., 1 cm, 5 mm, or 1 mm) from a perimeter of tag 205. Outer loop 210a can be configured to be fragile (e.g., due to a material of outer loop 210a or a thickness the outer loop). In some instances, but not in others, outer loop 210a is of a different thickness or material as compared to one or all other loops in antenna 210. For example, a thickness of a wire forming antenna 210 can be at least twice as thin in outer loop 210a relative to a most central loop.

The depicted positioning of outer loop 210a can cause the loop to be severed upon a tearing of tag 205, as illustrated in FIG. 2B. Tag 205 can be configured such that electronic chip 215 detects a disturbance of tag 205 by detecting a disturbance (e.g., severing) of outer loop 210a. In one instance, outer loop 210a connects electronic chip 215 to a pin 220. In some instances, electronic chip 215 and pin 220 can be positioned on opposite sides and/or corners of tag 205. Antenna 210 and pin 220 can be configured (e.g., positioned and/or shaped) such that a severing of outer loop 210a prevents electronic chip 215 from detecting pin 220. Electronic chip 215 can be configured so as to initiate transmission (e.g., via one or more undamaged loops in antenna 210 and/or another antenna) of data upon determining that pin 220 cannot be detected.

It will be appreciated that electronic tag 205 can, in some instances, include one or more additional components not shown in FIGS. 2A and 2B. For example, electronic tag 205 can include a top and/or bottom layer or surface (e.g., such that chip 215 as depicted in FIGS. 2A and 2B is positioned between and/or enclosed within the surfaces), such as a laminate, plastic or paper surface. In some instances, a top surface includes text, a graphic and/or a code, and/or a bottom surface includes an adhesive. Text and/or a graphic on electronic tag 205 can correspond to an invitation to "tap" an electronic device to the tag or can indicate that positioning an electronic device near the tag will facilitate an information transfer from the tag to the device.

Electronic tag 205 can be flexible and/or can be attached to a flexible substrate. Electronic tag 205 can have a size that can be characterized according to multiple dimensions, such as length, width and thickness or radius and thickness. A thickness of electronic tag 205 can be less than, e.g., 10, 50 or 100 microns, or 1, 5 or 10 millimeters. A length, width and/or radius of electronic tag can be, for example, greater than 0.1, 0.5 or 1 centimeters and/or less than 1, 3, 5, 10, 30 or 50 centimeters.

In some instances, electronic tag 205 is part of or is attached to a seal. The seal can include an adhesive bottom layer (e.g., which may be adhesive across part or all of the bottom layer) and a non-adhesive top layer. Electronic tag 205 can be included as part of one or both of the layers, attached to one or one or both of the layers and/or positioned in between the layers. For example, electronic tag 205 can be secured on top of the top layer. In some instances, electronic tag 205 may be positioned within a middle (along an axis perpendicular to a top-bottom axis) of the two layers. The seal may be configured to be positioned at least partly on an opening of a container (e.g., a food container) so as to inhibit opening of the container. Such positioning may inhibit or prevent a user from opening the container along the opening with removing, bending and/or tearing the seal. For example, a container may include a sandwich box that, without the seal, pivots at a first end of the box such that the box opens and closes (by separating and contracting top and bottom portions of the box) at a second opposite end. The seal can be positioned at the second opposite end (e.g., at least partly on each of the top and bottom portions) so as to inhibit opening of the box. As another example, the seal can be positioned at least partly on a top portion of a bag and a side of the bag, such that the seal promotes keeping the bag in a folded, closed position.

It will also be appreciated that, in some instances, tag 205 can include a configuration different than that described in relation to FIGS. 2A and/or 2B. For example, tag 205 can include an antenna 210 of a different shape and/or not including an outer loop 210a having a substantially different radius or other dimension relative to other loops in antenna 210. Meanwhile, antenna 210 can include a sensor, such as a vibration sensor and/or an accelerometer, which can be able to detect movements indicative of tag 205 being torn. Particular measurements from the sensor (e.g., above-threshold measurements) can trigger transmission of data from tag 205.

As another example, tag 205 need not include pin 220. In some instances, tag 205 can nonetheless detect a breaking of outer loop 210a via other techniques. For example, chip 215 can detect a pattern of transmissions received from a nearby electronic device. An abrupt change in received transmissions can be indicative of a break in outer loop 210a or another disruption to antenna 210.

As yet another example, in some instances, chip 215 need not be configured to detect a physical disturbance of tag 205 (e.g., via a failure to detect a pin, detecting an above-threshold sensor measurement or detecting a change in received communications). For example, chip 215 can initiate transmission whenever possible, so long as sufficient power is available and/or when one or more other conditions are satisfied. Electronic device 225 can then determine whether to store and/or use (e.g., via an app) data received from tag 205. This determination can be based on, for example, determining whether a characteristic of a transmission from tag 205 abruptly changed (e.g., detecting that a change in a signal strength is below a negative threshold or that transmissions from tag 205 ceased without preceding corresponding reduced signal strength).

Electronic device 225 can include a user, portable and/or handheld device, such as a smartphone, portable music player, smart wearable device (e.g., watch, glasses, wristband or armband). In some instances, electronic device 225 is configured to be worn on an arm, wrist or hand of a user. Such configuration may promote short-range data transfers between electronic tags associated with items the user is using or investigating and electronic device 225. Electronic device 225 and/or an app on electronic device 225 can be configured to present data received from electronic tag (e.g., via an app page or by displaying a webpage corresponding to a webpage link in the data) and/or to perform one or more actions in response to receipt of the data. For example, a calorie or reward count can be incremented, a nutritional recommendation can be made (e.g., identifying a target upper threshold of calories) or an estimated blood alcohol level can be updated.

Figure 3:
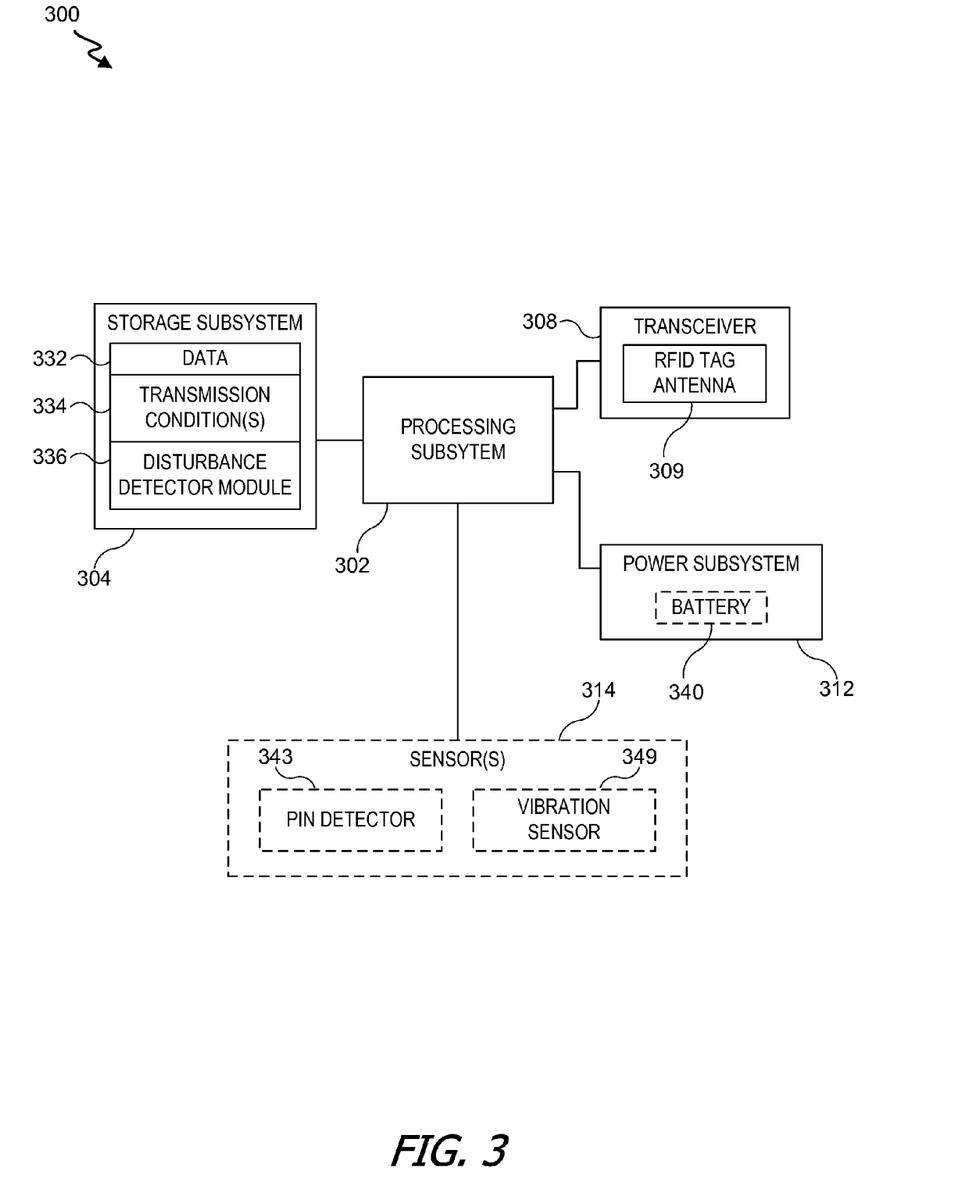
FIG. 3 is an example schematic diagram of an electronic tag according to an embodiment of the present invention.

FIG. 3 is an example schematic diagram of an electronic tag 300 (e.g., electronic tag 205) according to an embodiment of the present invention. Electronic tag 300 can include processing subsystem 302, storage subsystem 304, one or more connection components (e.g., transceiver subsystem 308), a power subsystem 312 and/or (in some embodiments) one or more sensors 314. Electronic tag 300 can also include other components (not explicitly shown).

Storage subsystem 304 can be implemented, e.g., using magnetic storage media, flash memory, other semiconductor memory (e.g., DRAM, SRAM), or any other non-transitory storage medium, or a combination of media, and can include volatile and/or non-volatile media. In some instances, some or all of the memory in storage subsystem 304 is readable and writable. In some instances, storage subsystem 304 can be configured such that (e.g., after encoding of tag 300) part or all of the memory can be locked to prevent alteration. Memory in storage subsystem 304, in some instances, can be less than or equal to 1 or 10 kB.

In some embodiments, storage subsystem 304 can store data. 332 to be (e.g., conditionally or unconditionally) transmitted to one or more nearby devices. Data 332 can include data encoded via another device and/or software (e.g., encoded via RFID and/or NFC). Data 332 can include, for example, text, a link (e.g., a web address) and/or a command. U.S. Application Nos. 62/111,214 and 62/111,292, each filed on Feb. 3, 2015, and each of which is hereby incorporated by reference in its entirety for all purposes, disclose exemplary electronic vendor devices, encoding processes and types of encoded data. Data 332 can be locked or unlocked. In some instances, one or more NFC Data Encoding Function (NDEF) payloads can be generated to include data 332 (e.g., within one or more records of a message of the NDEF message). The message can also include, for example, a header corresponding to each of the one or more payloads.

In some instances, tag 300 can be configured to accompany a product, such as a food product sold at an eatery or a piece of merchandise. For example, tag 300 can include or can be a sticker to be placed on a package or container of the product or can be part of a package or container. An electronic vendor device can then encode data that relates to the product and/or a purchase of the product. Such data 332 can include information about and/or related to the product (e.g., assembly and/or use instructions, warranty information, nutritional information, related products, user reviews of the product and/or a selling merchant, an option to provide a review of the product and/or a merchant, and/or a reward to be provided in response to the purchase). For example, an electronic vendor device can identify items to be included in a custom order and can encode the tag with data 332 that includes nutrition information particular to those items. For example, for an order of a hamburger, fries and drink, data 332 can include a per-item and/or total calorie count and/or other nutrition data (e.g., quantity of fat, sodium, protein and/or sugar). As another example, for an order of a hamburger with added mayonnaise and no ketchup, the vendor device can identify a calorie count and/or other nutrition data for the ordered hamburger in total and/or can identify nutrition data for the base hamburger, the added mayonnaise and the ketchup (to be excluded).

Data 332 can additionally or alternatively include a command to modify account data to reflect, for example, purchase and/or use of the product. To illustrate, the modification can include incrementing a product-purchase counter, incrementing a reward count by a defined number, incrementing nutritional values (e.g., calorie counts, fat-gram counts and/or vitamin-unit counts) by defined amounts, and/or adjusting an estimated blood alcohol level based on an identified quantity of alcohol.

Data 332 can additionally or alternatively include a command to initiate or facilitate presentation of a reminder. For example, tag 300 can include one to be provided with a medication, such that tearing of tag 300 can be estimated to be indicative of a person accessing and taking the medication. Data 332 can identify a number of doses having been provided, a scheduling regime of administration, an expected date of completion of the provided medication, a number of available refills, and/or other information (e.g., one or more potential side effects). In some instances, an electronic device can use data 332 to generate a reminder to obtain a refill of a prescription if needed and/or to determine when to (e.g., locally or remotely) present the reminder. For example, data 332 can be transmitted on November 1 that indicates that indicates that a prescription is a 2-week prescription and that a refill reminder is to be presented 3 days prior to an estimated completion date. An electronic device receiving data 332 can then identify a reminder date as being November 11 and can present the reminder on that date.

In some embodiments, storage subsystem 304 can also store one or more transmission conditions 334 that identify when some or all of data 332 is to be transmitted. For example, a transmission condition can identify a pin or a number of pins and be configured to trigger data transmission when the pin or number of pins are not detected. As another example, a transmission condition can identify a threshold for a sensor measurement and be configured to trigger data transmission when a detected measurement exceeds the threshold (e.g., in a positive direction or, alternatively, in a negative direction). As yet another example, a transmission condition can identify a characteristic of received transmissions. To illustrate, a condition can set forth a technique for identifying a frequency of communications being received from an electronic device and a trend in signal strengths of the communications. The condition can indicate that data transmission is to be triggered upon detecting that a power of a received communication departs from the identified trend (e.g., has decreased by more than a particular amount) or has not been received despite previously strong signal strengths.

In some instances, one or more transmission conditions identify which data is to be transmitted. For example, for a tag configured to accompany a food product, a detection of nearby device (e.g., via interception of electric and/or magnetic fields) can trigger tag 300 to transmit nutritional data to the device, and detection of physical disturbance of the tag can trigger tag 300 to transmit data including a command to adjust one or more nutritional counts (e.g., a calorie count) based on the nutritional data.

In some embodiments, a transmission condition can be configured to trigger or facilitate transmission of data 332 upon detecting satisfaction of a transmission condition defining a tag disturbance. Thus, storage subsystem 304 can also store code for a disturbance detector module 336. The disturbance detector module can be configured to monitor, for example, incoming transmissions, sensor readings, and/or pin detections. In some instances, one or more variables can be generated based on the monitoring, such as an inter-communication time, transmission frequency, signal strength, change in signal strength, change in a sensor reading, number of pins detected or whether a particular pin was detected. In some instances, a threshold can be identified, and a detected or generated variable can be compared to the threshold. The threshold can include one set forth in a transmission condition or generated based on a technique or formula as set forth in a transmission condition (e.g., using recently detected values to define the threshold).

The disturbance detector module can determine that a physical disturbance has been detected, for example, when a particular detection is made (e.g., detection of a particular pin), a particular detection is not made (e.g., a particular pin is not detected), a detected or generated value (e.g., a sensor measurement or variable determined based on one or more sensor measurements, or a characteristic of one or more incoming communications) exceeds a threshold.

Processing subsystem 302 can be implemented as one or more integrated circuits, e.g., one or more single-core or multi-core microprocessors or microcontrollers, examples of which are known in the art. In operation, processing system 302 can control the operation of electronic tag 300. In various embodiments, processing subsystem 304 can execute a variety of programs in response to program code and can maintain multiple concurrently executing programs or processes. At any given time, some or all of the program code to be executed can be resident in processing subsystem 304 and/or in storage media such as storage subsystem 304.

Through suitable programming, processing subsystem 302 can provide various functionality for electronic tag 300. For example, in some embodiments, processing subsystem 302 can execute code for disturbance detector module 336, evaluation of transmission conditions 334 and/or code to facilitate transmission of data 332.

Transceiver subsystem 308 can allow electronic tag 300 to communicate wirelessly with various electronic devices. Transceiver interface 308 can include a component, such as an antenna (e.g., a radio frequency identification (RFID) tag antenna 309) and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication. In some embodiments, transceiver subsystem 308 can implement a proximity sensor that supports proximity detection (e.g., via NFC or Bluetooth Low Energy) through a detection of a signal, estimation of signal strength and/or other protocols for determining proximity to another electronic apparatus.

RFID tag antenna 309 can include, for example, an NFC antenna and/or a loop antenna with one or more loops. In some instances, a length of antenna is less than, e.g., 1, 3, 5 or 10 cm. RFID tag antenna 309 can include or be a passive, receiving antenna. An operating frequency of RFID tag antenna 309 can include a low frequency (e.g., 125-134 kHz), high frequency (e.g., between 10-30 MHz, such as 13.56 MHz) or ultra-high frequency (e.g., greater than 800 MHz).

In some embodiments, transceiver subsystem 308 can provide NEC capability, e.g., implementing the ISO/IEC 18092 standards or the like; NFC can support wireless data exchange between devices over a very short range (e.g., 20 centimeters or less). Transceiver subsystem 308 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into transceiver subsystem 308. In some instances, a same component of transceiver subsystem 308 can serve to receive incoming signals and transmit outgoing signals. In some instances, different components handle incoming and outgoing signals.

In some embodiments, electronic tag 300 includes a power subsystem 312 that can provide power management capabilities for electronic tag and, in some instances, can provide power for electronic tag 300. Power subsystem 312 can include circuitry to distribute received, converted and/or stored power to other components of electronic tag 300 that require electrical power.

In some instances, power subsystem 312 can convert electric and/or magnetic fields (e.g., received via antenna 309) into electrical energy, which can be distributed to tag components and/or used to charge a local battery. In some (but not other instances), power subsystem 312 can include a battery 340 (e.g., a rechargeable battery) and can also include circuitry operable to charge battery 340. Thus, in some embodiments, power subsystem 312 can include a "wireless" charger, such as an inductive charger, to charge battery 340. This capability can be used to extend a time during which tag 300 can transmit data (e.g., such that data can be transmitted even when it is not sufficiently close to be powered by a nearby electronic device) and/or can allow electronic tag 300 to communicate using a different communication protocol and/or over a larger range. For example, power can be received via NFC from a nearby electronic device and used to charge battery 340. As the device is moved away from the device, tag 300 may be unable to communicate with the device via NFC. However, the charge of the battery can allow tag 300 to use a more power-intensive protocol (e.g., Bluetooth Low Energy) to communicate with the device, thereby extending a time during which the tag and device can communicate. In some embodiments, power subsystem 312 can also include other power sources, such as a solar cell, in addition to or instead of battery 340.

In some embodiments, power subsystem 312 can control power distribution to components within electronic tag 300 to manage power consumption efficiently. For example, power subsystem 312 can automatically place device 300 into a "hibernation" state when it is determined or inferred that no electronic device is nearby (e.g., due to a lack of incoming signals). The hibernation state can serve to inhibit or pause outgoing transmissions of data.

Power subsystem 312 can also provide other power management capabilities, such as regulating power consumption of other components of electronic tag 300 based on the source and amount of available power, monitoring stored power in battery 340, and so on.

In some embodiments, control functions of power subsystem 312 can be implemented using programmable or controllable circuits operating in response to control signals generated by processing subsystem 302 in response to program code executing thereon, or as a separate microprocessor or microcontroller.

In some instances, electronic tag 300 includes one or more sensors 314, such as one or more electronic, mechanical, electromechanical, optical, or other devices that provide information related to internal external conditions around electronic tag 300. Sensors 314 in some embodiments can provide digital signals to processing subsystem 302, e.g., on a streaming basis or in response to polling by processing subsystem 302 as desired. Any type and combination of sensors can be used; shown by way of example are a pin detector 343 and a vibration sensor 349. Pin detector 343 can detect, for example, how many pins tag 300 detects (e.g., via a connection between individual pins and antenna 309), which pins are detected and/or which pins are detected (e.g., or which portions of tag 300 detect pins). This detection can be used to evaluate a transmission condition (e.g., such that transmission can be facilitated or initiated upon failure to detect a pin).

A vibration sensor 349 can be configured to detect a vibration of one or more parts of tag 300 or all of tag 300. Vibration sensor 349 can include, for example, a piezoelectric material configured to convert mechanical strain into electrical energy. This detection can be used to evaluate a transmission condition (e.g., such that transmission can be facilitated or initiated upon detection of sensor readings exceeding a threshold). One or more other sensors (e.g., an accelerometer) can also be included in addition to or instead of these examples.

It will be appreciated that electronic tag 300 is illustrative and that variations and modifications are possible. For example, transceiver subsystem 308 can include a different type of antenna 309 and/or can include one or more frequency-tuning components (e.g., capacitors).

Further, while the electronic tag 300 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic tags implemented using any combination of circuitry and software. It is also not required that every block in FIG. 3 be implemented in a given embodiment of an electronic tag.

Figure 4:
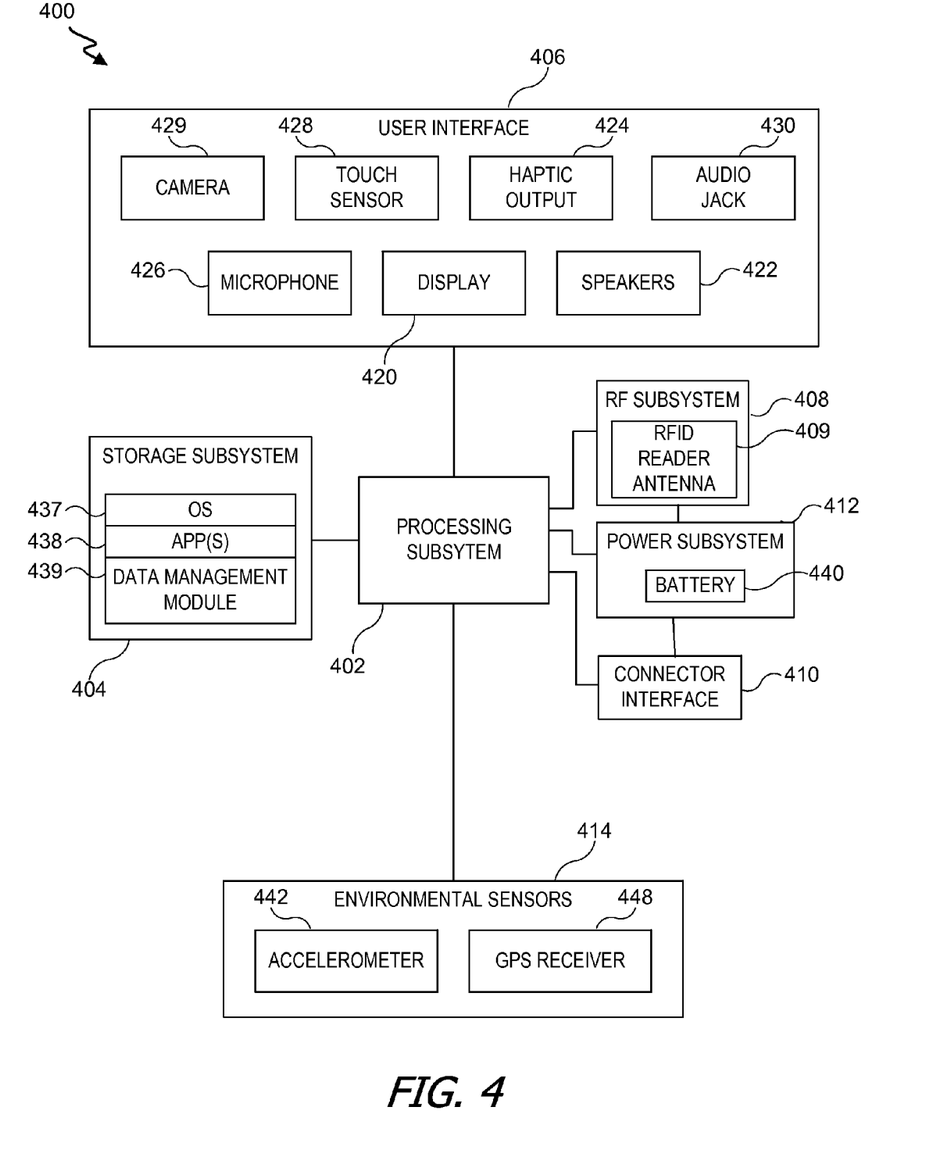
FIG. 4 is an example schematic diagram of an electronic device according to an embodiment of the present invention.

FIG. 4 is an example schematic diagram of an electronic device 400 (e.g., electronic device 225) according to an embodiment of the present invention. Electronic device 400 can include processing subsystem 402, storage subsystem 404, user interface 406, one or more connection components (e.g., RF subsystem 408 and/or connector interface 410), power subsystem 412, and environmental sensors 414. In some instances, one or more components of electronic device 400 can parallel or complement similarly numbered components of electronic tag 300. Electronic device 400 can also include other components (not explicitly shown).

Storage subsystem 404 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 404 can store media items such as audio files, video files, image or artwork files; information about a user's contacts (names, addresses, phone numbers, etc.); appointments and events; notes; and/or other types of information, examples of which are described below.

In some embodiments, storage subsystem 404 can also store code or instructions for an operating system 437 and/or one or more application programs (or apps) 438 to be executed by processing subsystem 402. Apps 438 can include, for example, a tracking app, such as an app configured to track eating patterns, estimated alcohol levels, spending patterns and/or rewards.

Storage subsystem 404 can, in some instances, also include code or instructions for a data management module 439, which can detect incoming data (e.g., included in one or more signals from an electronic tag) and control whether to store all or part of the data and/or distribute all or part of the data to one or more apps. Data management module 439 can make this determination by, for example, identifying and/or analyzing one or more characteristics of received signals. For example, data management module 439 can use one or more recent transmissions from an electronic tag to predict whether (e.g., and when) a next signal is expected and/or signal strength of a next transmission. Upon determining that an expected signal has not been received or that a signal strength is below an expected value (e.g., and a defined buffer), data management module 439 can store, route or avail data included in a current or previous communication. As another example, data management module 439 can determine a change in signal strength or latency between two signals from an electronic tag. Upon detecting a change value below a defined threshold, data management module 439 can store, route or avail data included in a current or previous communication.

In some instances, an app includes a data management module. For example, an app can determine whether to adjust a tracked parameter based on received data based on whether transmissions from an electronic tag abruptly stopped (e.g., without a preceding decrease in signal strength of a defined magnitude) and/or whether a decrease in signal strengths of the transmissions is below a defined threshold.

User interface 406 can include any combination of input and output devices. In some instances, a user can operate input devices of user interface 406 to invoke the functionality of electronic device 400 and can view, hear, and/or otherwise experience output from electronic device 400 via output devices of user interface 406. Examples of output devices include display 420, speakers 422, and haptic output generator 424. Examples of input devices include microphone 426, touch sensor 428, and camera 429.

Display 420 can be implemented using compact display technologies, e.g., LCD (liquid crystal display), LED (light-emitting diode), OLED (organic light-emitting diode), or the like. In some embodiments, display 420 can incorporate a flexible display element or curved-glass display element, allowing electronic device 400 to conform to a desired shape. One or more speakers 422 can be provided using small-form-factor speaker technologies, including any technology capable of converting electronic signals into audible sound waves. In some embodiments, speakers 422 can be used to produce tones (e.g., beeping or ringing) and can but need not be capable of reproducing sounds such as speech or music with any particular degree of fidelity. Haptic output generator 424 can be, e.g., a device that converts electronic signals into vibrations; in some embodiments, the vibrations can be strong enough to be felt by a user wearing electronic device 400 but not so strong as to produce distinct sounds.

Touch sensor 428 can include, e.g., a capacitive sensor array with the ability to localize contacts to a particular point or region on the surface of the sensor and in some instances, the ability to distinguish multiple simultaneous contacts. In some embodiments, touch sensor 428 can be overlaid over display 420 to provide a touchscreen interface, and processing subsystem 404 can translate touch events (including taps and/or other gestures made with one or more contacts) into specific user inputs depending on what is currently displayed on display 420.

Camera 429 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 404 and/or transmitted by electronic device 400 to other devices for storage. Depending on implementation, the optical components can provide fixed focal distance or variable focal distance; in the latter case, autofocus can be provided. In some embodiments, camera 429 can be disposed along an edge of a face member of a device, e.g., the top edge, and oriented to allow a user to capture images of nearby objects in the environment such as a bar code or QR code. In other embodiments, camera 429 can be disposed on the front surface of a device face member, e.g., to capture images of the user. Zero, one, or more cameras can be provided, depending on implementation.

Microphone 426 can include any device that converts sound waves into electronic signals. In some embodiments, microphone 426 can be sufficiently sensitive to provide a representation of specific words spoken by a user; in other embodiments, microphone 426 can be usable to provide indications of general ambient sound levels without necessarily providing a high-quality electronic representation of specific sounds.

In some embodiments, user interface 406 can provide output to and/or receive input from an auxiliary device such as a headset. For example, audio jack 430 can connect via an audio cable (e.g., a standard 2.5-mm or 3.5-mm audio cable) to an auxiliary device. Audio jack 430 can include input and/or output paths. Accordingly, audio jack 430 can provide audio to the auxiliary device and/or receive audio from the auxiliary device. In some embodiments, a wireless connection interface can be used to communicate with an auxiliary device.

Processing subsystem 402 can be implemented as one or more integrated circuits, e.g., one or more single-core or multi-core microprocessors or microcontrollers, examples of which are known in the art. In operation, processing system 402 can control the operation of electronic device 400. In various embodiments, processing subsystem 404 can execute a variety of programs in response to program code and can maintain multiple concurrently executing programs or processes. At any given time, some or all of the program code to be executed can be resident in processing subsystem 404 and/or in storage media such as storage subsystem 404.

Through suitable programming, processing subsystem 402 can provide various functionality for electronic device 400. For example, in some embodiments, processing subsystem 402 can execute an operating system (OS) 437, one or more apps 438 and/or data management module 439.

RF subsystem 408 can allow electronic device 400 to communicate wirelessly with various devices (e.g., an electronic tag). RF subsystem 408 can include RF transceiver components, such as an antenna (e.g., RFID reader antenna 409) and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication. In some embodiments, transceiver subsystem 308 can implement a proximity sensor that supports proximity detection (e.g., via NFC or Bluetooth Low Energy) through a detection of a signal, estimation of signal strength and/or other protocols for determining proximity to another electronic device.

RFID reader antenna 409 can include one or more antennas configured to transmit electric and/or magnetic signals (e.g., having linear or circular polarization). RFID reader antenna 409 can repeatedly scan for electronic tags. Because some tags can be passive and not including a power source (or can have a limited power reserve), to detect the tag, RFID reader antenna can repeatedly transmit a power signal. If such signal is transmitted while near a tag, the tag can convert the signal into electrical energy and use the energy to generate and transmit a signal back to electronic device 400. In some instances, between 1 and 20 scanning transmissions can be transmitted per second.

In some embodiments, RF subsystem 408 can provide NFC capability, e.g., implementing the ISO/IEC 18092 standards or the like; NFC can support wireless data exchange between devices over a very short range (e.g., 20 centimeters or less). RF subsystem 408 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF subsystem 408. In some instances, a same component of RF subsystem 408 can serve to receive incoming signals and transmit outgoing signals (e.g., by outputting a field and intercepting a modulation of the field). In some instances, different components handle incoming and outgoing signals.

Environmental sensors 414 can include various electronic, mechanical, electromechanical, optical, or other devices that provide information related to external conditions around electronic device 400. Sensors 414 in some embodiments can provide digital signals to processing subsystem 402, e.g., on a streaming basis or in response to polling by processing subsystem 402 as desired. Any type and combination of environmental sensors can be used; shown by way of example are an accelerometer 442 and GPS receiver 448.

Some environmental sensors can provide information about the location and/or motion of electronic device 400. For example, an accelerometer 442 can detect an acceleration of device 400 (e.g., generally or in each of one or more directions). As another example, a GPS receiver 448 can receive communications from multiple GPS satellites and estimate a location of device 400. It will be appreciated that other sensors can also be included in addition to or instead of these examples.

Power subsystem 412 can provide power and power management capabilities for electronic device 400. For example, power subsystem 412 can include a battery 440 (e.g., a rechargeable battery) and associated circuitry to distribute power from battery 440 to other components of electronic device 400 that require electrical power. In some embodiments, power subsystem 412 can also include circuitry operable to charge battery 440, e.g., when connector interface 410 is connected to a power source. In some embodiments, power subsystem 412 can include a "wireless" charger, such as an inductive charger, to charge battery 440 without relying on connector interface 410. In some embodiments, power subsystem 412 can also include other power sources, such as a solar cell, in addition to or instead of battery 440.

Power subsystem 412 can also provide power management capabilities, such as regulating power consumption of other components of electronic device 400 based on the source and amount of available power, monitoring stored power in battery 440, generating user alerts if the stored power drops below a minimum level, and so on. Power subsystem 412 can also coordinate distribution of power to RF subsystem 408 so as to facilitate conversion of electrical power to electric and/or magnetic fields to be transmitted in scanning signals and/or to electronic tags.

In some embodiments, control functions of power subsystem 412 can be implemented using programmable or controllable circuits operating in response to control signals generated by processing subsystem 402 in response to program code executing thereon, or as a separate microprocessor or microcontroller. In some embodiments, control functions of power subsystem 412 can be based on user interaction with the device (e.g., to power down components if a device has not been interacted with in a particular manner, such as via a touch, button press or network activity, for a defined period of time).

It will be appreciated that electronic device 400 is illustrative and that variations and modifications are possible. For example, device 400 can include an additional environmental sensor, such as a gyroscope to detect a position of electronic device 400.

Further, while the electronic device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 4 be implemented in a given embodiment of an electronic device.

Figure 5:
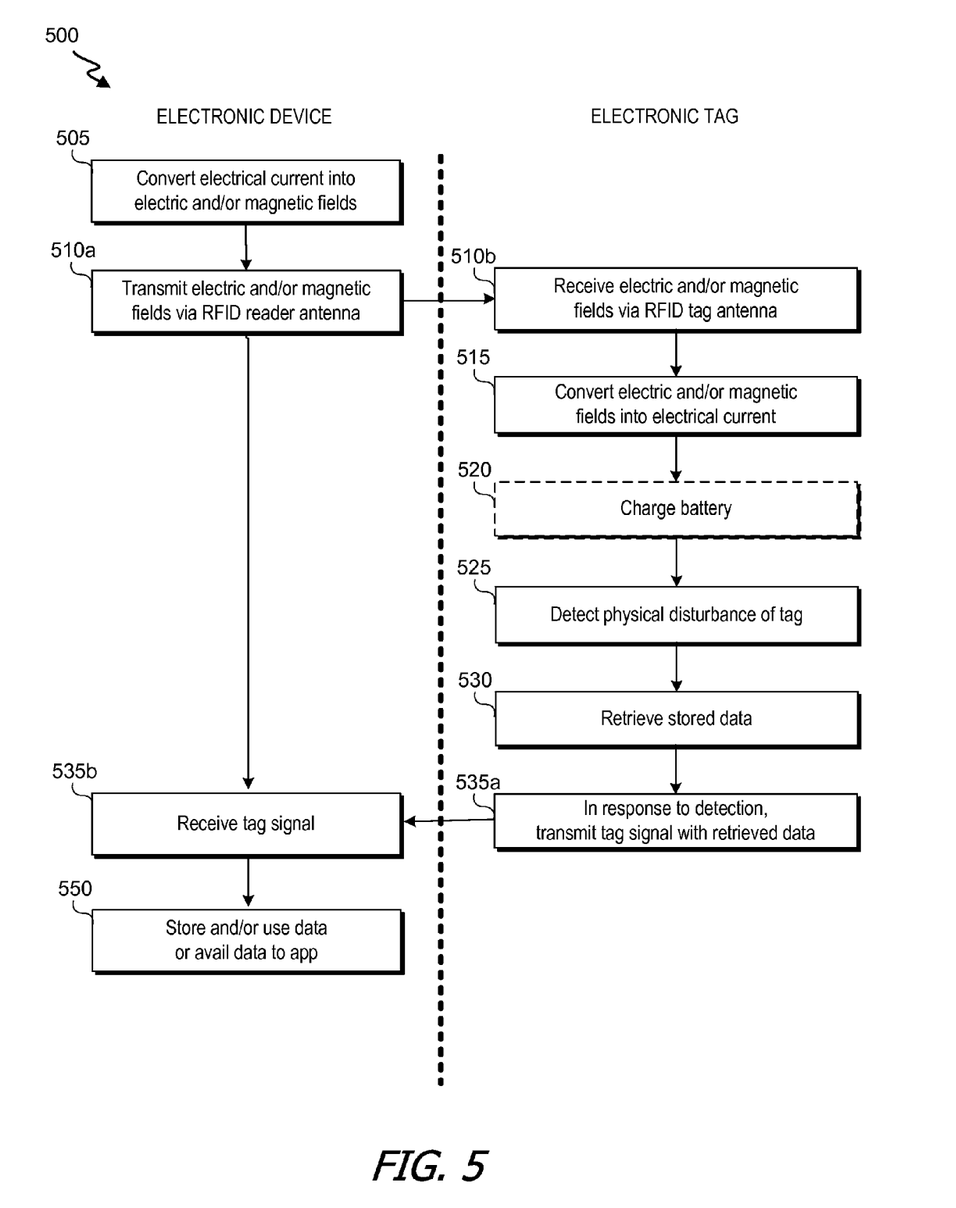
FIG. 5 is a flow diagram of a process for a conditioned transmission of data from an electronic tag to an electronic device according to an embodiment of the present invention.

FIG. 5 is a flow diagram of a process 500 for conditioned transmission of data from an electronic tag to an electronic device according to an embodiment of the present invention. In some instances, execution of one or more apps on an electronic tag or electronic device can cause one or more processors of the electronic tag or electronic device to perform one or more actions in process 500. In some instances, one or more modules (e.g., disturbance detector module 336 or data management module 439) can perform one or more actions in process 500.

At block 505, the electronic device can convert electrical current into electric and/or magnetic fields. For example, an oscillating electric current can be provided to an antenna (e.g., an RFID reader antenna) such that magnetic and/or electric fields are produced around antenna elements. In some instances, process 500 utilizes NFC, and block 505 produces a magnetic field. In some instances, an electromagnetic field is generated.

At block 510a, the electronic device can transmit (e.g., radiate) the electric and/or magnetic fields (e.g., via an antenna). At block 510b, the electronic tag can receive (e.g., intercept) the electrical and/or magnetic fields (e.g., via an antenna, such as an RFID tag antenna).

At block 515, the electronic tag can convert the electric and/or magnetic fields back into electrical current. For example, the waves can exert force on electronics in antenna elements to produce oscillating currents.

In some instances, the electronic tag can be an active tag that includes a battery. At least part of the electrical current can then be used to partly or fully charge the battery. In some instances, the electronic tag can be a passive tag without a battery, and block 520 can be omitted from process 500.

The electrical current can be used to perform one or more other actions (e.g., via direct use of the current or via a battery having been charged by the current), such as one or more of those in blocks 525-535a. One action can include, at block 525, detecting a physical disturbance of the tag. It will be appreciated that a detection of the physical disturbance can include, for example, detecting an above-threshold sensor measurement, absence of a pin detection or change in incoming transmissions that is indicative of the physical disturbance. Thus, the detection need not include actually detecting the physical disturbance itself but can instead detect another indication that the physical disturbance has occurred.

In some instances, the physical disturbance can be detected by collecting and assessing one or more sensor measurements. For example, one or more measurements from an accelerometer or vibration sensor can be collected. In some instances, the measurement(s) can be processed, e.g., to average the measurements across a time period. A sensor measurement (or processed version of one or more measurements) can be compared to a threshold, which can include (for example) a fixed threshold or a relative threshold (e.g., 150% of an average sensor reading across a previous 10-minute period). Detecting the physical disturbance can include determining that a sensor measurement or processed version of one or more measurements exceeds the threshold.

In some instances, the physical disturbance can be detected by monitoring pin detections. A physical disturbance can be detected by, for example, determining whether a particular portion of the tag (e.g., a particular portion of an antenna of the tag) is in contact with or detects a pin, whether a defined number (or at least a defined number) of pins are detected, whether a particular pin is detected. For example, an antenna can be configured such that a loop of the antenna is connected to a pin. If the loop is broken via a physical disturbance, a chip in the tag can fail to detect the pin. Thus, detecting whether a physical disturbance occurred can include determining that a pin is not detected.

In some instances, detecting a physical disturbance can include detecting that a characteristic (e.g., impedance or resistance) of an antenna of the tag has changed or exceeded a threshold. In some instances, detecting a physical disturbance can include detecting a change (e.g., an above-threshold change) in incoming signals. For example, an antenna can be configured to be fragile (e.g., via selection of a small width of the antenna and/or a weak material) at least partly track a perimeter of the tag and be within a defined small distance from an edge of the tag. Thus, a rip of the tag can break the antenna. Breaking the antenna can reduce the power that can be received from fields from an electronic device and/or can inhibit the tag from receiving a signal from the device.

Thus, detecting the physical disturbance can include, for example, detecting that a power received from an electronic device has dropped below an absolute threshold or relative threshold (e.g., 70% of the power provided in a previous 1-second interval). As another example, detecting the physical disturbance can include determining that a previous signal from an electronic device provided a power above a threshold and that no subsequent signal (at an expected time or within a defined time period) had been received.

In some instances, the electronic tag includes a perforation and can be configured to detect a physical disturbance that corresponds to separation of the tag at the perforation. For example, a chip and part of an antenna can be positioned on one side of the perforation, another part of the antenna can positioned on another side of the perforation, and the detection can correspond to detecting a break in the antenna.

At block 530, the electronic tag can retrieve stored data, which can include data locally stored in a memory of the electronic tag. In some instances, the data can be retrieved in response to the detection at block 525. The data can include locked data or unlocked data. The data can, for example, include text, a graphic, a webpage address and/or a command. For example, the data can include a command to generate and/or present a presentation reflecting information in the data. As another example, the data can include a command to increment a count (e.g., a reward, calorie, carbohydrate or expenditure count) by a specified number.

The data can relate to an item accompanying the electronic tag. For example, the electronic tag can be configured to be positioned on (e.g., stuck to), included in and/or connected to packaging of a product. The packaging can include, for example, a container, box, plastic cover, cup, or lid. The packaging can at least partly or fully enclose a product, such as a piece of merchandise, a toy, a food product, a drink or medication. The data can include instructions pertaining to the (e.g., enclosed) item, such as assembly instructions, use instructions, maintenance instructions and/or administration instructions. The data can include other information pertaining to the item, such as a name of the item, one or more features of the item, one or more specifications of the item, a warranty, nutritional information, alcohol content or one or more user reviews. The data can also include an identification of an app to which to avail part or all of the data.

The data can include a command, such as one indicating that a presentation is to be presented, such as one or more instructions, nutrition variables, item identifications or other data are to be presented on a receiving electronic device (e.g., immediately, at a particular time or upon receipt of a particular user input). A command can alternatively or additionally indicate that a variable (e.g., associated with a user account, such as a reward variable or cumulative nutrition variable) is to be updated based on the data.

At block 535*a*, a tag signal can be transmitted that includes the retrieved data, and at block 535*b*, the tag signal can be received at the electronic device. Block 535*a* can include, for example, modulating an existing field provided by the electronic device (e.g., that provided at block 510*a*) or by generating a new field corresponding to the data. In the latter instance, the electronic device can alternate between supplying and receiving electric and/or magnetic fields. The communication of blocks 535*a-b* can occur, for example, via NFC, a short-range network, using Bluetooth Low Energy, using Bluetooth, wirelessly and/or using a same communication protocol as used in blocks 510*a-b*. Thus, at a time of transmission, the electronic device and electronic tag may be physically proximate (e.g., close enough for the transmission to occur via NFC, within 12 inches or within 6 inches).

At block 550, the electronic device can store and/or use the data and/or avail the data to an app. For example, the data can include an identifier of an app. The electronic device can then initiate execution of the app if it is not currently executing and route data from the signal to be used by the app. The app can then, for example, use the data to adjust account data, change a tracked parameter (e.g., calories consumed), facilitate an informational presentation, facilitate transmission of some or all of the data to a remote server, generate a behavioral recommendation to be presented via a user interface and so on. As another example, the electronic device can use the data to perform a command as identified in the data.

It will be appreciated that process 500 is illustrative, and various alternative embodiments are contemplated. For example, alternative embodiments can include one or more additional actions, fewer actions and/or different actions relative to those depicted in FIG. 5. In one instances, blocks 505-520 can be omitted from process 500.

Figure 6:
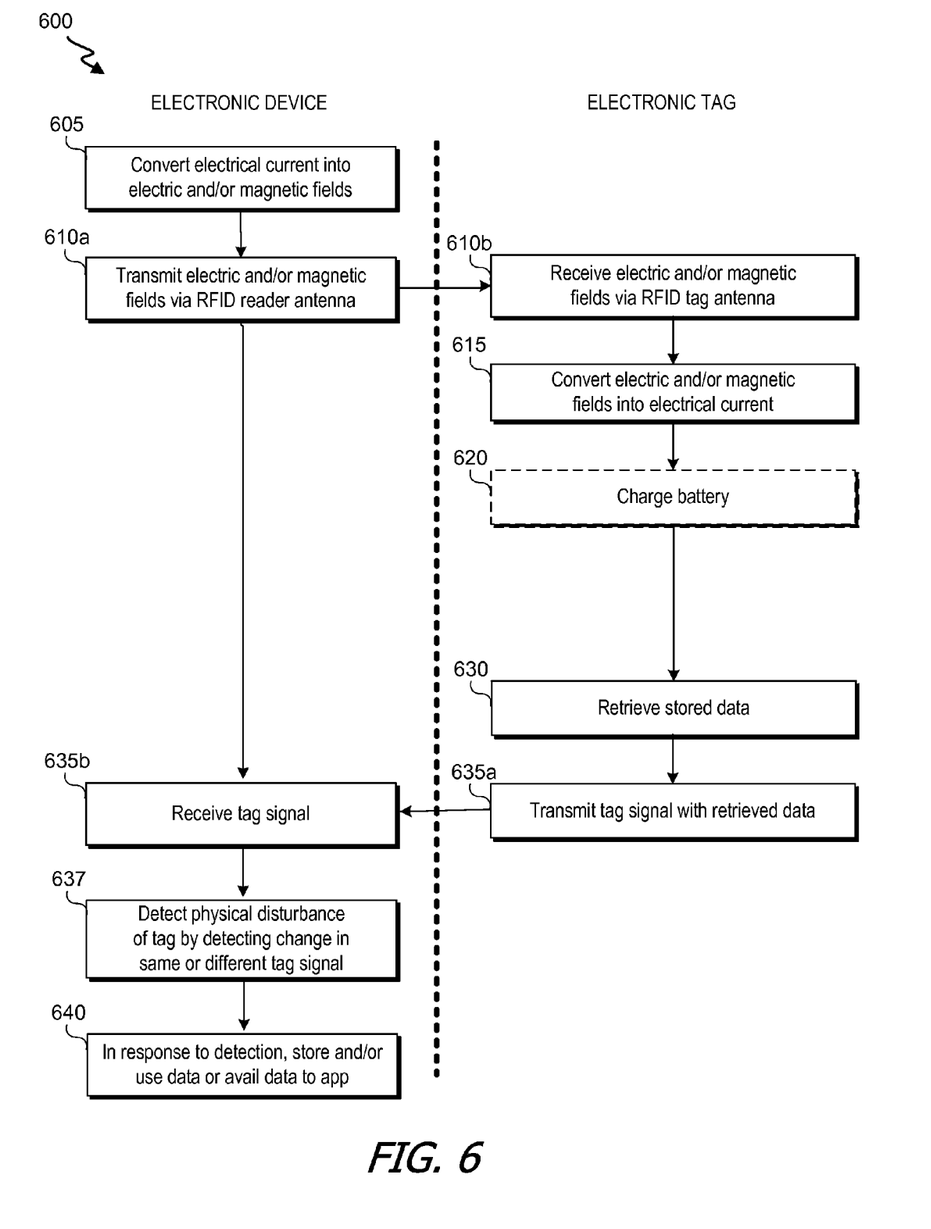
FIG. 6 is a flow diagram of a process for conditioning storage or use of data transmitted from an electronic tag to an electronic device based on detection of a tag signal change according to an embodiment of the present invention.

FIG. 6 is a flow diagram of a process 600 for conditioning storage or use of data transmitted from an electronic tag to an electronic device based on detection of a tag signal change according to an embodiment of the present invention. Various blocks (e.g., 605, 610*a-b*, 615, 620, 630, 635*a-b* and 640) in process 600 can parallel blocks with corresponding numbers in process 500. However, in process 600, the electronic tag need not detect a physical disturbance of the tag. In some instances, execution of one or more apps on an electronic tag or electronic device can cause one or more processors of the electronic tag or electronic device to perform one or more actions in process 600. In some instances, one or more modules (e.g., disturbance detector module 336 or data management module 439) can perform one or more actions in process 600.

Rather, the electronic device can detect the disturbance of the tag at block 637. Block 637 can include identifying and/or assessing a characteristic of one or more tag signals received from the electronic tag. The characteristic can include, for example, a signal strength (e.g., strength of modulation of a field). Detection of a physical disturbance can correspond to detecting that the characteristic, a change in the characteristic across time or signals and/or an acceleration in the characteristic across time or signals is below a threshold. In response to the detection, the data represented in the tag signal can be stored, used and/or availed to an app, as further discussed herein.

Thus, embodiments of the present invention can provide a variety of techniques for detecting a physical disturbance of a tag and conditioning one or more actions (e.g., retrieval of stored data at the tag, transmission of data from the tag to an electronic device, storing the data at an electronic device, using (e.g., presenting) the data at an electronic device and/or availing the data to an app at an electronic device) on the detection. This conditioning can conserve resources of the tag and/or device and/or can restrict usage of data to appropriate instances. For example, a tag can store data including instructions to increment a reward count. However, such modification can be selectively appropriate in instances where an accompanying product was purchased. The physical disturbance can correspond to gaining access to an enclosed package and can indicate that the purchase was made and reward count increment is appropriate. Similarly, ripping a tag positioned on a fast food container can indicate that a nearby user is going to eat a food item in the container. Thus, it can be appropriate to adjust a nutritional tracker based on stored data identifying nutrition information of the food item.

Embodiments of the present invention, e.g., in methods, apparatus, computer readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A seal comprising:
   an adhesive bottom layer;
   a non-adhesive top layer; and
   an electronic tag positioned on or in the adhesive bottom layer or non-adhesive top layer or positioned in between the adhesive bottom layer and non-adhesive top layer, the electronic tag including:
   one or more processors; and a computer-readable storage medium containing instructions, that, when executed by the one or more processors, cause the one or more processors to perform actions including:
  detecting, at the electronic tag, a physical disturbance of the electronic tag;
  retrieving, at the electronic tag, stored data from a local memory; and
  responsive to the detection, facilitating transmission of a signal from the electronic tag that includes the retrieved data from a transmitter of the electronic tag to a device using radio frequency identification (RFID);
  wherein the seal is configured to be positioned on a food container containing a food item so as to inhibit opening of the food container, and
  wherein the retrieved data includes nutritional information for the food item.

2. An electronic tag comprising:
one or more processors; and
a computer-readable storage medium containing instructions, that, when executed by the one or more processors, cause the one or more processors to perform actions including:
  detecting, at the electronic tag, a physical disturbance of the electronic tag;
  retrieving, at the electronic tag, stored data from a local memory; and
  responsive to the detection, facilitating transmission of a signal from the electronic tag that includes the retrieved data from a transmitter of the electronic tag to a device using RFID.

3. The electronic tag of claim 2, wherein detecting the physical disturbance includes:
  determining that a pin included in the electronic tag is not detected;
  detecting a disruption to at least part of an antenna of the electronic tag; or
  determining that a receiver of the electronic tag has not received another signal from the device within a defined time period.

4. The electronic tag of claim 2, wherein detecting the physical disturbance is indicative that a part of the electronic tag has been physically separated from another part of the electronic tag.

5. The electronic tag of claim 2, wherein:
  the electronic tag includes an RFID tag that includes a chip and the transmitter;
  the transmitter includes an antenna that includes a plurality of coils;
  the physical disturbance corresponds to a disruption to a coil in the plurality of coils; and
  the signal is transmitted via one or more other coils in the plurality of coils.

6. The electronic tag of claim 2, further comprising a vibration sensor, wherein detecting the physical disturbance includes:
  detecting a sensor signal from the vibration sensor; and
  determining that a variable corresponding to the sensor signal exceeds a threshold.

7. The electronic tag of claim 2, wherein detecting the physical disturbance includes:
  determining that a receiver of the electronic tag has not received another signal from the device within a defined time period.

8. The electronic tag of claim 2, wherein the stored data includes nutritional information for one or more food items in a custom order.

9. The electronic tag of claim 2, wherein the electronic tag does not include a local battery and performs at least part of the actions using power supplied from a nearby electronic device.

10. The electronic tag of claim 2, wherein a thickness of the electronic tag is less than 1 millimeter.

11. The electronic tag of claim 2, wherein the device includes a wearable electronic device that is, at a time of the transmission, physically proximate to the electronic tag.

12. A computer-implemented method comprising:
  detecting, at an electronic tag, a physical disturbance of the electronic tag;
  retrieving, at the electronic tag, stored data from a local memory; and
  responsive to the detection, transmitting a signal that includes the retrieved data from a transmitter of the electronic tag to a device using RFID.

13. The method of claim 12, wherein detecting the physical disturbance includes:
  determining that a pin included in the electronic tag is not detected;
  detecting a disruption to at least part of an antenna of the electronic tag; or
  determining that a receiver of the electronic tag has not received another signal from the device within a defined time period.

14. The method of claim 12, wherein detecting the physical disturbance is indicative that a part of the electronic tag has been physically separated from another part of the electronic tag.

15. The method of claim 12, wherein:
  the electronic tag includes an RFID tag that includes a chip and the transmitter;
  the transmitter includes an antenna that includes a plurality of coils;
  the physical disturbance corresponds to a disruption to a coil in the plurality of coils; and
  the signal is transmitted via one or more other coils in the plurality of coils.

16. The method of claim 12, wherein detecting the physical disturbance includes:
  detecting a sensor signal from a vibration sensor, wherein the electronic tag includes the vibration sensor; and
  determining that a variable corresponding to the sensor signal exceeds a threshold.

17. The method of claim 12, wherein the stored data includes nutritional information for one or more food items in a custom order.

18. The method of claim 12, wherein the electronic tag does not include a local battery and performs at least part of the method using power supplied from a nearby electronic device.

19. The method of claim 12, wherein a thickness of the electronic tag is less than 1 millimeter.

20. The method of claim 12, wherein the device includes a wearable electronic device that is, at a time of the transmission, physically proximate to the electronic tag.

21. The method of claim 12, wherein the electronic tag is part of or attached to a seal positioned on a food container configured to contain a food item, and wherein the retrieved data includes nutritional information for the food item.

22. An electronic device comprising:
  one or more processors; and a computer-readable storage medium containing instructions, that, when executed by the one or more processors, cause the one or more processors to perform actions including:
  detecting, at the electronic device, data in one or more signals received from an electronic tag;
  detecting, at the electronic device, a physical disturbance of the electronic tag based on the one or more signals; and
  responsive to the detection, storing or using the data at the electronic device.

23. The electronic device of claim 22, wherein detecting the physical disturbance of the electronic tag includes detecting that a change or acceleration of a magnitude of a modulation of a field in the one or more signals is below a threshold.

24. The electronic device of claim 22, wherein using the data includes:
  incrementing a count by a value identified in the data;
  presenting information included in the data; or
  presenting a webpage identified in the data.

25. The electronic device of claim 22, wherein electronic device is a wearable electronic device.

26. A computer-implemented method comprising:
  receiving, at an electronic device, one or more signals from an electronic tag, the one or more signals including data;
  detecting, at the electronic device, a physical disturbance of the electronic tag based on the one or more signals; and
  responsive to the detection, storing or using the data at the electronic device.

27. The method of claim 26, wherein detecting the physical disturbance of the electronic tag includes detecting that a change or acceleration of a magnitude of a modulation of a field in the one or more signals is below a threshold.

28. The method of claim 26, wherein detecting the physical disturbance of the electronic tag includes:
  detecting that a magnitude of a modulation of a field in the one or more signals is above a threshold; and
  detecting that another signal from the electronic tag had not been received within a defined time period.

29. The method of claim 26, wherein using the data includes:
  incrementing a count by a value identified in the data;
  presenting information included in the data; or
  presenting a webpage identified in the data.

30. The method of claim 26, wherein the one or more signals are received using near-field communication (NFC).

* * * * *